United States Patent [19]

Rice

[11] Patent Number: 4,929,348

[45] Date of Patent: May 29, 1990

[54] APPARATUS FOR CARRYING OUT EXTRACTIONS IN SUBTERRANEAN WELL

[75] Inventor: Wayne K. Rice, P.O. Box 9, Wanatah, Ind. 46390

[73] Assignee: Wayne K. Rice, Wanatah, Ind.

[21] Appl. No.: 320,214

[22] Filed: Mar. 6, 1989

Related U.S. Application Data

[62] Division of Ser. No. 74,091, Jul. 16, 1987, Pat. No. 4,810,373, which is a division of Ser. No. 732,362, May 8, 1985, Pat. No. 4,683,063.

[51] Int. Cl.$^5$ .................................................. B01D 11/04
[52] U.S. Cl. ...................................... 210/109; 55/297; 210/112; 210/170; 210/177; 210/414; 210/511; 422/208; 422/260; 422/281; 196/14.52
[58] Field of Search ............... 166/267; 210/170, 177, 210/194, 511, 109, 112, 406, 414, 415, 416.1; 196/14.52; 422/208, 256, 260, 281, 290; 55/295–297, 525

[56] References Cited

U.S. PATENT DOCUMENTS

| 3,449,247 | 6/1969 | Bauer | 210/747 |
| 3,887,008 | 6/1975 | Canfield | 166/267 |
| 4,027,731 | 6/1977 | Smith et al. | 166/267 |
| 4,272,383 | 6/1981 | McGrew | 210/741 |
| 4,328,255 | 5/1982 | Roselius et al. | 426/417 |
| 4,406,742 | 9/1983 | Dick | 210/511 |
| 4,564,458 | 1/1986 | Burleson | 210/747 |
| 4,810,373 | 3/1989 | Rice | 210/414 |

Primary Examiner—Peter Hruskoci
Attorney, Agent, or Firm—Cook, Egan, McFarron & Manzo

[57] ABSTRACT

The present invention relates generally to improvements in processes and apparatus for effecting solvent extractions using liquefied gas or gases in the supercritical state as the solvents and specifically to continuous processes for carrying out such extractions at high pressures. Further, the present invention relates to an apparatus which is a long vertical cylinder of relatively small diameter, wherein the solvent gas and the material to be extracted are continuously circulated through the long vertical reactor.

12 Claims, 2 Drawing Sheets

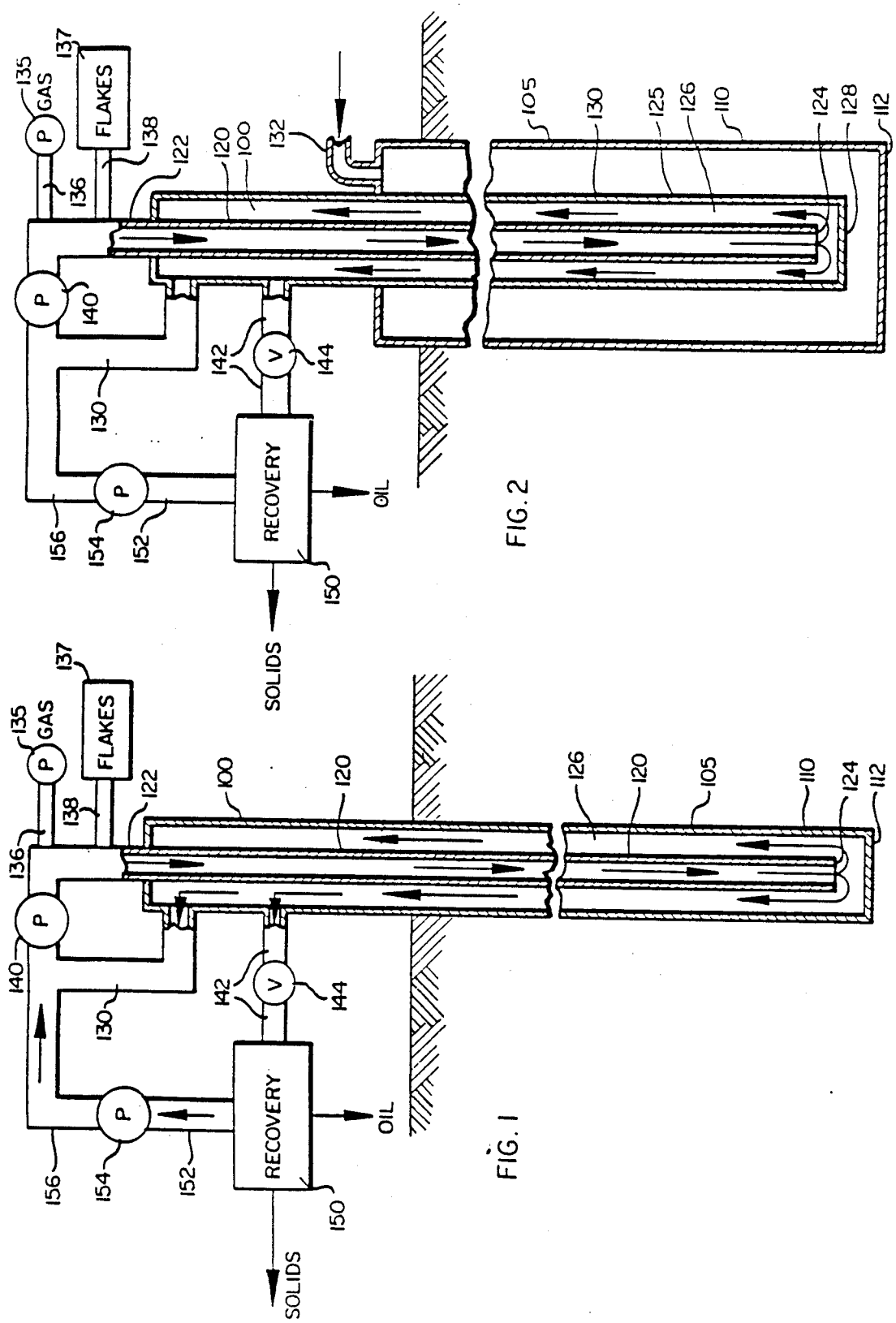

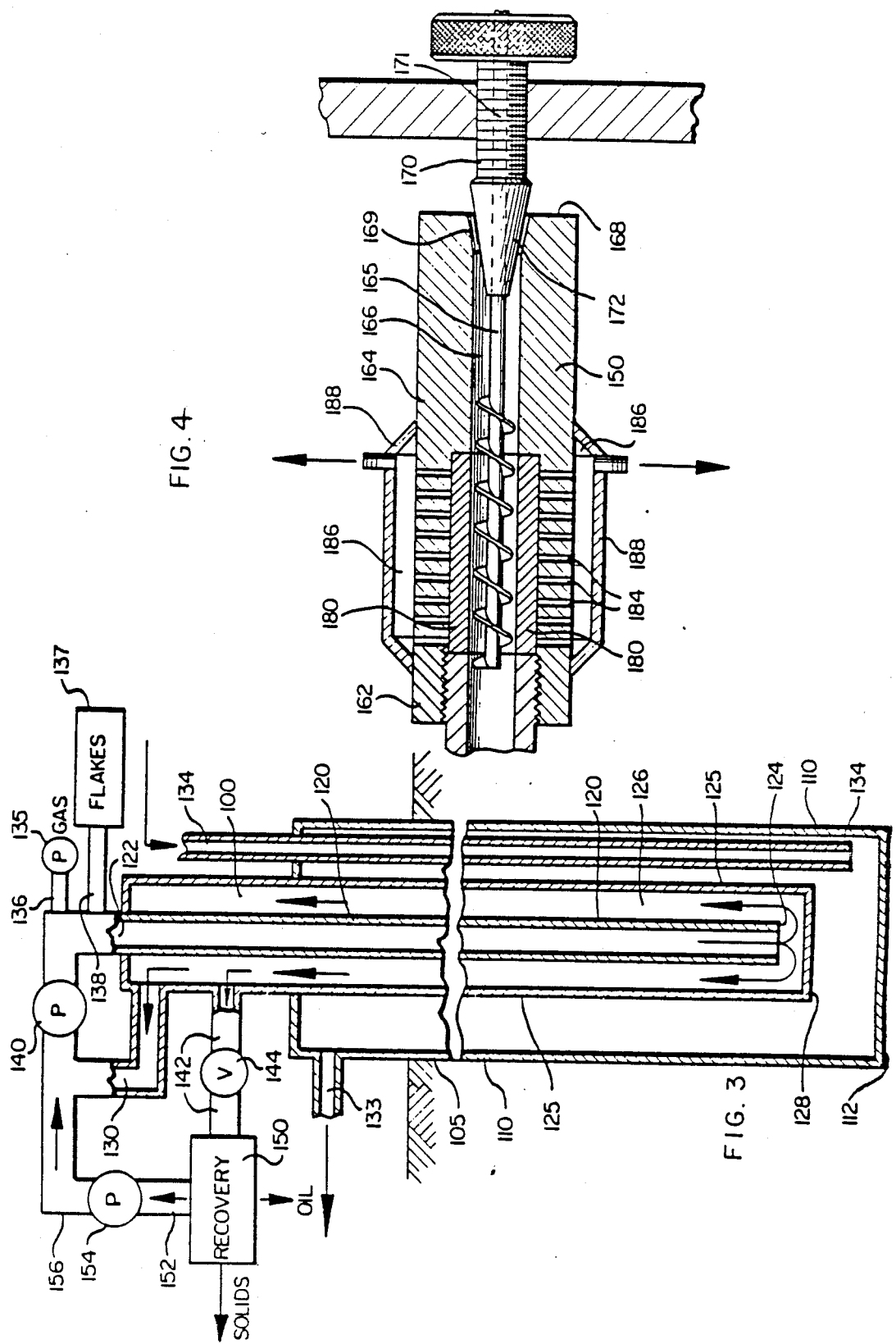

APPARATUS FOR CARRYING OUT EXTRACTIONS IN SUBTERRANEAN WELL

This is a division of application Ser. No. 074,091, filed 7/16/87, U.S. Pat. 4,810,373 which is a divisional of application Ser. No. 732,362 filed 5/8/85, U.S. Pat. No. 4,683,063.

BACKGROUND OF THE INVENTION

The use of liquified gases and supercritical fluids to carry out extractions has been described in the prior art. Such prior art processes involve the use of supercritical fluids at pressures in excess of 3,000 to 5,000 psi, although in some cases the recommended pressures exceed 10,000 psi.

The prior art processes, however, are generally run as batch processes because of limitations of apparatus and because of limitations involved on materials of construction used to create the apparatus in which the high pressure processes are carried out.

Processes for extractions run at extremely high pressures are described in the following U.S. Pat. Nos.:
4,156,688;
4,328,255;
4,466,923;
4,493,854; and
4,495,207.

The prior art has suggested the use of underground reactor vessels and specifically subterranean wells as the situs for carrying out various chemical reactions. Typical of such prior art are the following U.S. Pat. Nos.:
3,449,247;
3,464,885;
3,606,999;
3,853,759; and 4,272,383.

These patents, for the most part, disclose the subterranean oxidation of various waste materials under elevated pressure conditions, but do not suggest the extremely high pressures required for the extractions of the type contemplated by the present invention.

SUMMARY OF THE INVENTION

The present invention relates to an improved apparatus for effecting the solvent extraction of a soluble substance from materials, which may be solid, semi-solid or liquid, utilizing a long vertical cylinder extraction vessel which preferably has a subterranean situs. In is simplest embodiment, the extraction vessel comprises a vertical cylindrical down-going pipe that extends below the ground surface for a substantial distance and a concentrically positioned return pipe which forms an annular opening which extends from the bottom of the well to ground surface. This provides a vertical cylindrical extraction vessel in which the extraction process takes place at a substantial distance below the ground surface. The fluid solvent and material to be extracted are pumped down the down-going pipe from the ground surface at a controlled pressure, temperature, moisture and flow rate to the bottom of the extraction vessel whereat the fluid mixture column formed in the extraction vessel creates the optimum pressure conditions necessary for the extraction. Thereafter, continued pumping of the solvent fluid with or without added material to be extracted, causes the extracted material to be cycled back to the earth surface in the annular space of the extraction vessel. In the preferred embodiment, the extracted materials are held under pressure while the extracted residue solids are separated from the extracted substance and the extracting solvent.

In its broadest embodiment, the present invention contemplates the use of a subterranean well, e.g., oil well, as the situs of an extraction process. The present invention contemplates taking advantage of the high fluid heads created by carrying out extractions in subterranean borings which may extend miles into the ground, e.g., 20,000 feet or more. This permits extraction processes to be carried out on a continuous basis below ground level, without the need for expensive, ultra high pressure equipment under conditions which are required for above ground installations.

In the preferred embodiment, a cased subterranean hole is filled with a fluid of a controlled specific gravity. A long, slender extraction vessel (perhaps several thousand feet long) is suspended in the fluid within the cased subterranean hole. The cased subterranean hole may also be pressured, as desired, to mechanically reinforce the structural strength of the long, slender extraction vessel which is used to carry-out the ultra high pressure extraction. By controlling the specific gravity of the fluid in the casing, the long, slender extraction vessel will be permitted to partially "float" in the fluid filled ground hole, thus greatly lowering the material strength and design requirement for the extraction vessel shell. Moreover, the fluid creates a pressure jacket around the long slender extraction vessel which enables the use of thinner walls in the extraction vessel.

In the broadest embodiment, the present invention contemplates the use of any fluids (including liquids, gases or supercritical fluids) as the extracting solvent. In the preferred embodiment, the extracting fluid is normally a gaseous substance which may be liquefied through high pressures. Useful gases are $N_2O$, $SF_6$, $CF_3Cl$, $CF_2Cl$, $CH_2CF_2$, $C_3F_8$, $CHF_3$, ethane, propane, butane, ethylene, carbon dioxide, or mixtures thereof, which are unobjectionable gases from the point of view of health. Carbon dioxide is the gas particularly preferred in most of the processes according to the invention.

The maximum temperature at which a gas can be liquefied is called the critical temperature and the pressure required to cause liquefaction at this temperature is the critical pressure. The critical temperature of e.g. carbon dioxide is about 31.1° C. and the critical pressure is 73.8 bar.

If gases other than carbon dioxide are used, the ranges in respect of pressures and temperatures outlined hereinafter in the specification can be obtained from data described in handbooks of Physical Chemistry.

The process is generally carried out as a co-current extraction by introducing the fluid solvent and the material to be extracted at the top of the well. Fluid solvent is continuously circulated through the well. The material to be extracted is introduced into the circulating solvent and is carried down to the bottom of the well, where it is subjected to optimum pressure conditions. The continued circulation of the fluid solvent then carries the extract, the residue of the material to be extracted and the fluid solvents back up to the top of the well, at which time they are introduced to the recovery apparatus.

In the preferred embodiment, the well is first flushed with gas to remove air and other gases from the system. After flushing, the extracting gas, for example, carbon dioxide, is introduced continuously to fill the system, the purge valve is closed and the charging of the gas is continued until the entire system is under an elevated pressure of the gas, preferably at least 2,000 psi. It is important that the gas be under sufficient pressure to cause the specific gravity of the gas to rise, preferably to at least 0.8, in order to support the material to be extracted and to prevent it from settling to the bottom of the well where plugging could occur. When the solvent fluid is $CO_2$, the desired specific gravity of 0.8 is reached at about 2,000 psi. Those skilled in the art will understand that if gases other than $CO_2$ or liquids are used as the solvent, that higher or lower pressures or different specific gravities may be used.

After the well is charged with a gas and the pressure reaches the threshhold value, pumps are activated to continuously circulate the fluid through the well system and thus establish a flow of a fluid having a specific gravity of about 0.8 throughout the system.

The material to be extracted is then introduced into the down-going leg of the reactor into the circulation fluid where it forms a mixture of material to be extracted suspended in the extracting fluid. The material to be extracted must be introduced into the well at a pressure commensurate with the pressure of the solvent being circulated through the well.

The amount of material to be extracted loaded into the system will vary depending upon the operating pressures, and the nature of both the material to be extracted and the extracting gases.

As the material to be extracted is charged into the system, it is carried to the bottom of the well by the circulating fluid and then back to the top of the well where the recovery of the extracted materials may take place.

In one embodiment, a portion of the output from the well is sent to the recovery system, while the balance of the output is recirculated. A corresponding amount of feed and extracting fluid is continuously introduced to the input side of the system to make up for the portion directed to the recovery system and an equilibrium system is established.

In another embodiment, the material to be extracted may be introduced intermittently, and when the leading edge of the material to be extracted arrives at the top of the well, the entire output of the well may be fed through the recovery system.

In yet another embodiment, the material to be extracted may be fed intermittently to the well and recovered by routing a portion of the well output through the recovery system. Other methods of operating the process will occur to those skilled in the art.

The recovery system used to separate the solvent fluid extracted oil mixture from the extracted residue solids may vary widely. Any conventional means, such as filtration, may be employed. Alternatively, one may use the apparatus described herein below, which is preferred in that it separates the solvent fluid oil mixture from the residue solids at elevated pressures. The oil-solvent fluid mixture may be subsequently separated by a variety of mechanisms, including decantation or simply allowing the solvent fluid to vaporize as a gas from the oil. Other systems may be used by adjusting the temperature and/or pressure of the mixture to effect a separation.

Other objectives, advantages and capabilities of the present invention will become more apparent as the description proceeds, taken in conjunction with the accompanying drawings in which like parts have similar reference numerals and in which:

DESCRIPTION OF THE DRAWINGS

FIG. 1 is a schematic diagram of the simplest embodiment of the apparatus of the present invention showing an extraction vessel comprising a subterranean well, shown as a cut-away side view;

FIG. 2 is a schematic diagram of a second embodiment of the present invention showing the reaction vessel suspended in a subterranean well shown as a cut-away side view;

FIG. 3 is a schematic diagram of a third embodiment of the present invention, wherein the reaction vessel is suspended in a subterranean well having provision for heat control, shown in cut-away side view; and FIG. 4 is a cut-away side view of a liquid-solid separator adapted for use at high pressures.

DESCRIPTION OF THE PREFERRED EMBODIMENTS

Referring now to FIG. 1, the schematic diagram shows a vertical extraction vessel 100 which comprises a subterranean well 105 drilled into the ground, wherein the well is lined with casing 110, and closed with a lower closure 112. Concentrically located within casing 110 is input pipe 120 which comprises the downward leg of extraction vessel 100. The upward leg of extraction vessel 100 comprises the annular space 126 between casing 110 and input pipe 120. The upper end of the annular space 126 is connected through output pipe 130 to recirculation pump 140 adapted to pump the fluids back to input pipe 120.

The input pipe 120 is connected to gas supply 135 through pipe 136. Gas supply 135 provides gas, preferably under sufficient pressure to liquefy the gas, in quantity sufficient to fill the well. The gas from supply 135 is pumped into the well under pressure until the specific gravity of the gas increases sufficiently to support the material to be extracted. After the desired pressure has been reached, recirculation pump 140 is activated in order to circulate the fluid through the system.

After the fluid circulation at the desired pressure has been started, the material to be extracted is introduced to input pipe 120 through extruder 137 by pipe 138. The material to be extracted must be introduced at pressures in excess of the well operating pressure and suitable pressure generating equipment, such as extruder 137 or other similar equipment must be used.

Recirculation pump 140 must be adapted to pump a mixture of the material to be extruded in the liquefied gas, and to do so at a rate sufficient to keep the solids suspended and avoid plugging of the well.

The recovery of the extracted material is accomplished in recovery unit 150. Pipe 142 connects the annular portion 126 of the reactor through valve 144 to the recovery unit 150 more fully described below, valve 144 is adapted to bleed off a selected portion of the well output, which may vary from 0-100%. Preferably a plurality of recovery units are used in tandem to allow maintenance of individual units without the need to shut down the system.

Solvent fluid emerging from recovery unit 150 is through pipe 152 where it is compressed by pump 154 and fed back to the circulating fluid in the well through pipe 156. It may be desired to recondition such emerging fluids to remove extracted material such as water or sulfur before the gas from recovery unit 150 is returned to the well.

In the broadest embodiment, shown in FIG. 1, the solvent gas is pumped into inlet 122 of input pipe 120. After the required circulating pressure has been reached, the material to be extracted, optionally mixed with solvent, is introduced and is carried downwardly by the circulating fluid through input pipe 120 to the lower opening 124. When the solid-solvent mixture reaches the bottom of the extraction vessel, i.e., at lower opening 124, the effective pressure will be the sum of the pressure at inlet 122 plus the fluid head developed by the fluid column existing in the length of input pipe 120.

For most extraction processes, it is contemplated to use sufficient pressure at the inlet to not only liquefy the solvent gas but to raise the specific gravity of the gas high enough to entrain the material to be extracted in the flowing gas. It is contemplated that the inlet pressure at ground level may run as high as 2,000 to 5,000 psi, or even higher. In such cases, the mixed solvent and solids may be injected into the inlet pipe 122 using extruders of the type conventionally used to extrude plastic or to transport oilseed materials as in a continuous screw press. It is preferred to extrude solids into the well, but the flow of the solids may be assisted by injection of the extracting fluid. Such apparatus, which is commercially available, is able to achieve pressures of 3,000 to 5,000 psi and higher on oilseed materials in continuous expellers and to transport such materials as desired.

It will be apparent to those skilled in the art that the residence time under high pressure at the bottom of a well, i.e., lower opening 124, will be dependent upon the rate of circulation of the mixture in the system. As the injection and circulation is continued, the material to be extracted will exit from lower opening 124 and begin to rise through annular space 126 (defined by inlet pipe 120 and casing 110) to output pipe 130.

As the high pressure mixture of solvent and solids are circulated through the extraction vessel by output pipe 130, it is fed to the recovery system 150 described below.

As an example of soy meal extraction, the ratio of solvent to meal preferably is dilute enough to retain full solubility of the extracted oil in the solvent at top hole operating pressures, to thus permit full separation of fluid-oil mix from the soy meal at the top of the well. It is contemplated that a mixture of about 10% by weight of soybean meal and 90% by weight of carbon dioxide may be used in this embodiment. Alternatively, the system described above may be operated using a more concentrated "load" of material to be extracted (i.e., a higher ratio of soy meal to solvent).

In the preferred embodiment, the extraction carried out at the bottom of the bore hole would be run at pressures sufficient to substantially extract the oils from the material to be extracted, but wherein the pressures at the top of the well and in recovery means are high enough to enhance the separation of the extracted residue from the free oil and saturated solvent fluid. This returning product stream would first be separated into meal solids and a solution of lipids and $CO_2$ fluid.

A further embodiment of the system contemplates increase of the system pressure at the top of the extractor to the extent that the lipids which are extracted from the soybean flakes remain fully miscable in the $CO_2$ fluid at the surface and may therefore be returned to the separation process. It is contemplated that this embodiment is carried out by charging soybean flakes to the circulating $CO_2$ at a relatively low pressure of 2,000 psi, for example. Then the charging of the soybean flakes would be terminated and the charging of the $CO_2$ solvent would continue in order to increase the total pressure on the circulating system and ensure the solubility of the oils in the $CO_2$ fluid. It is believed that this embodiment would cause a more rapid and complete extraction of the lipids throughout the system and retain the lipids in the soluble state for separation of the extracted solids residue from the extracted lipids and the $CO_2$ separation.

FIG. 2 shows another embodiment of the present invention, similar to that shown in FIG. 1, but wherein the extraction vessel 100 comprises inlet pipe 120 and outlet pipe 125 which define annular space 126. Outlet pipe 125 is sealed by lower closure 128. In this embodiment the extraction vessel 100 is suspended in well 105 defined by casing 110. Casing 110 may be sealed by lower closure 112. As explained herein below the annular space between the casing 110 and the pipe 125 may be filled with a fluid of desired density using inlet 132, and pressurized in order to achieve the desired pressures on the outside of pipe 125. Fluids having specific gravity greater than 1.0 may be advantageously used.

This embodiment will permit the controlled partial "float" of a separate long, slender vessel, fitted with a concentric downflow pipe to form a extraction vessel. Due to the well fluid buoyancy, the mechanical strength of the long extraction vessel can be greatly reduced and expensive materials, such as stainless steel, economically used. Because the fluid functions as a pressure jacket for extraction vessel 100, the wall thickness of the extraction vessel may be reduced, thus further reducing the overall weight of the system.

By pressuring the casing fluid surrounding the extraction vessel 100, an increased compensating external force can be established on the exterior shell of extraction vessel 100, thus permitting the use of higher extraction vessel system pressures which would exceed the rupture point of an unsupported extraction vessel. Since supercritical carbon dioxide systems are relatively corrosive, the use of exotic metals, such as titanium, stainless steel, etc., to fabricate the extraction vessel may be necessary in some cases. By pressuring the external wall of extraction vessel 100 in a controlled manner, a lighter weight of exotic metal may be used in the construction of the extraction vessel, thereby reducing the weight of the extraction vessel and its consequent cost.

By the use of pressurized casing technique set forth above, it is possible to safely raise the pressure in the extraction vessels and wells of relatively shallow depth could be economically used. Indeed, it is feasible to build a system based on this concept above ground, although the safety of the subterranean situs is preferred.

The extraction vessel of the second embodiment is operated in essentially the same manner as the extraction vessel of the first embodiment. However, the extraction vessel of the second embodiment has the advantage that the extraction vessel 100 may be fabricated from relatively lightweight stainless steel and suspended in the fluid within casing 110 which, in effect, provides a pressure jacket for the extraction vessel and thus eliminates the need to have a thick walled extraction vessel capable of withstanding the internal pressures needed to carry out the desired reactions and extractions.

The most preferred embodiment, shown in FIG. 3, is similar to the embodiment shown in FIG. 2 in that the extraction vessel 100 which is comprised of input pipe 120 and outer pipe 125 with lower closure 128 is suspended in well 105 within casing 110. Heat control pipe 134 which extends into well 105, within casing 110, may be used to control temperature at the bottom of the well, and thus effect control of both the temperature and pressure within extraction vessel 100. Outlet pipe 133 is provided to circulate the fluid throughout the annular space between the well casing 105 and the extraction vessel 100.

FIG. 4 illustrates the preferred style of apparatus for separating the solvent and extracted liquids from the solid residue at high pressures. It is preferred that several recovery units be used in tandem. Basically, the fluid from the extraction vessel is passed from outlet pipe 142 into the recovery system 150. Outlet pipe 142 is threadedly engaged to fitting 162 affixed to body 164 of recovery system 150. Body 164 has a longitudinal opening 166 which is adjustably closed at the output end 168 by adjustable plug 170. Adjustable plug 170 has tapered end 172 adapted to fit into tapered opening 169 of output end 168 but plug 170 is adjustable, as by thread means 171, to control the aperture between the tapered plug 172 and tapered opening 169. Controlling the position of plug 172 in opening 169 enables the operator to control the rate at which solids are removed from the system. Preferably a screw 165 driven by motor (not shown) is positioned within opening 166 to move solids continuously toward output end 168. Those skilled in the art will understand that the position of tapered plug 172 in tapered opening 169 may be controlled by means other than threads, i.e., hydraulically and the like.

Positioned near the inlet end of body 164 is porous metal sleeve or other porous media 180 which is fitted within body 164 adjacent to a plurality of apertures 184 which connect porous body 180 and pressurized jacket 186 which is formed by housing 188. Porous metal sleeve 180 may be fabricated from sintered metal, expanded metal or other types of porous membranes.

As the output from the extraction vessel 100 is fed through pipe 142 to the recovery device 150, the space between plug 170 and opening 169 is reduced to a minimum and a plug of solids forms at the output end 166 of recovery device 150. The position of plug 170 in tapered opening 169 is thereafter adjusted to control the rate at which solids are discharged. A static layer or cake of solids also forms adjacent to porous metal sleeve 180, but its thickness is limited by screw 165 which urges the solids toward output end 166. The liquid components of the extraction output (i.e., a mixture of the solvent and extracted liquids) seep through the solids cake, through porous metal sleeve 180 and through openings or apertures 184 into the vessel 186 defined by pressurized jacket 188. The pressure within vessel 186 can be regulated to control the pressure drop through the solids cake and porous metal sleeve 180. The control of this pressure drop may be coordinated with the position of plug 170 to achieve a continuous separation of the solids from the liquids at elevated pressures.

The recovery system 150 enables the separation of the liquid from the solids at high pressures which is, as is more fully explained below, the preferred condition for making the solvent solid separation. The solvent may be separated from the liquid extract using any of several processes.

The following examples will serve to illustrate the use of subterranean wells in the extraction of soybean flakes using supercritical carbon dioxide, but it is understood that these examples are set forth merely for illustrative purposes, and many other materials may be extracted using a variety of different conditions.

EXAMPLE I

A subterranean well of the type shown in FIG. 1 is flushed with commercial, dry $CO_2$. The well has a depth of about 20,000 feet with a 6 inch casing. Input pipe 120 has a 3 ½ inch diameter. When the gas emerging from the well is essentially free of alien gases (air), the purging valve (not shown) is closed and the charging of $CO_2$ is continued until a pressure at ground level of 2,000 psi is achieved. The recirculation pump 140, which has a 12 inch bore is run at 40 strokes per minute. The pump circulates the $CO_2$ at 18,000 gallons per hour. The downward flow of $CO_2$ is about 1,000 feet per minute, with a return velocity, in the annular space 126, of about 300 feet per minute.

Clean soybeans are cracked, dehulled and flaked by passing through a smooth roller mill. The flakes are metered into a continuous screw press extruder and into input pipe 120 in the well to form a ratio of 9 parts by weight of $CO_2$ for each part by weight of soybeans. The flakes are introduced into the circulating $CO_2$ in the well at 2,000 psi until a 10% solids loading is achieved.

At the bottom of the well, a pressure of approximately 12,000 psi is achieved. Tests have shown that at such pressures, soybean oil is highly soluble in carbon dioxide.

By continuously circulating the $CO_2$ mixture through the well, the extracted solid residue, soybean oil and carbon dioxide returns to the surface. The total residence time in the well is about 80 minutes. The liquids are separated from the solid residue, as by filtration. The liquids, after separation from the solids, are exposed to atmospheric pressure, at which time the carbon dioxide evaporates leaving a highly refined purified soybean oil.

EXAMPLE II

An apparatus of the type depicted in FIG. 2 is charged with $CO_2$ and pressurized as described in Example 1. Cracked, dehulled soybean flakes are mixed with circulating liquid carbon dioxide at a 1 to 9 weight ratio (flakes to $CO_2$).

After the initial charging at 2,000 psi, the well extraction vessel pressure is increased to 12,000 psi by in-putting additional $CO_2$ as necessary. The solids-$CO_2$ mixture is continuously circulated through the system.

A portion of the output of the well is continuously removed from output pipe 130 into recovery system 150 while make-up $CO_2$ and/or make-up feed (comprising cracked soybeans and carbon dioxide) are introduced into the system to maintain the pressure at well head at 12,000 psi.

The recovery apparatus is operated at elevated pressures wherein the internal pressure in opening 166 is maintained at approximately 12,000 psi, while the pressure in the pressurized jacket is maintained at 10,000 psi, providing for a 2,000 psi drop over the solids cake formed inside.

The fluids from the pressurized jacket are transferred further to separation equipment wherein the oil is separated from the fluid $CO_2$ at about 2,000 psi and the $CO_2$, maintained at 2,000 psi, is used as make-up and fed to pipe 122.

The products of this example are the separated soybean oil and the soybean flake residue which is substantially free of carbon dioxide extractable oils.

The apparatus of the present invention may be used in carrying out a wide variety of processes. In addition to using the apparatus of the present invention in the extraction of soybeans illustrated herein below, this apparatus may be applied to the extraction of various materials using various solvent gases and to various chemical reactions which may be enhanced through the use of high pressures generated by this apparatus.

Generally, it is preferred to apply the apparatus of the present invention to extractions using supercritical gases such as carbon dioxide, the freons, and various low molecular weight hydrocarbons. Such supercritical fluids may be used to extract oil from soybeans, as is illustrated herein. Moreover, the apparatus of the present invention may be adapted at extracting a wide variety of lipids from organic matter, extracting caffine from coffee or tea, as well as the extraction of residual oils, and hops extraction. It is further contemplated that these processes may be used to recover diluted solvents from water, diesel oil from drilling muds and other compounds, to regenerate activated carbon and other adsorbants which are contaminated with organics, coal liquefication or extraction, removal of impurities from polymer melts, separating waxes and resins from residual oil, delignification and pulping of wood in the oxidation of hazardous wastes and deashing synthetic fuels. With slight modification, the apparatus of the present invention can be adapted for extractions utilizing conventional solvents, such as water, hexane, heptane, alcohols, etc, wherein extractions more rigorous than that of conventional percolation methods may be of advantage.

The apparatus of the present invention is particularly useful in carrying out the extraction of oil from soybeans as described in U.S. Pat. No. 4,493,854 to Friedrich and Eldridge, the extraction of lipids from lipid containing material as described in U.S. Pat. No. 4,466,923 to Friedrich, and the production of food grain corn germ as described in U.S. Pat. No. 4,495,203 to Christianson and Friedrich, in extracting coffee oil from roasted coffee as described in U.S. Pat. No. 4,328,255 to Roselius, Vitzthum and Hurbert, and in fractionating butterfat as described in U.S. Pat. No. 4,504,503 to Biernoth et al.

In carrying out the extraction of soybean oil from soybean solids using supercritical $CO_2$, it is generally desired to follow the process conditions set forth in the above identified Friedrich and Eldridge patent and to generate, if possible, at the bottom of the extraction vessel the conditions set forth therein. In carrying out this process, the conditions at the bottom of the extraction vessel should be as follows: total pressure be at least 690 bar and preferably from about 827 to 855 bar and a temperature of at least 81° C. with the temperature preferably at from about 81° C. to 84° C., and a humidity not more than 15% and preferably from 10% to 12%.

The forms of invention herein shown and described are to be considered only as illustrative. It will be apparent to those skilled in the art that numerous modifications may be made therein without departure from the spirit of the invention or the scope of the appended claims.

I claim:

1. An apparatus for carrying out a co-current solvent extraction using as the solvent a liquefiable fluid, which apparatus comprises:

a long, small-diameter, vertical cylinder extraction vessel;

a vertical pipe concentrically disposed within said extraction vessel extending downwardly from the top of said extraction vessel to near the bottom of said extraction vessel, said pipe defining an annular opening within said extraction vessel;

means to continuously charge said fluid at a pressure of at least about 2,000 psi; into the top of said extraction vessel to fill said extraction vessel;

means to circulate said pressurized fluid through said extraction vessel;

means to charge a material to be extracted into the circulating fluid within said extraction vessel, whereby said charged material is mixed with said fluid and the resulting mixture is carried to the bottom of said extraction vessel where the pressure head formed by the mixture of said charged fluid and said charged material increases the total pressure at the bottom of said extraction vessel, to a pressure selected to provide solubility of selected components of said material to be extracted in said fluid, means to continuously circulate said fluid through said extraction vessel to cause the charged material to be extracted to move upwardly to the top of the extraction vessel; and recovery means located near the top of said extraction vessel constructed to separate solids from fluids having a pressure of at least about 2,000 psi, said recovery means comprising a porous membrane means for receiving a portion said mixture from said extraction vessel, said membrane constructed to allow passage of fluid from said mixture, but not solids; said membrane positioned within a pressure jacket; said recovery means having apertures to permit the flow of fluid from said extraction vessel through said membrane to said pressure jacket; and control means to regulate the pressure within said jacket to control the rate of flow of said fluid through said membrane.

2. An apparatus as described in claim 1 which comprises means to compress said fluid charged into the top of said extraction vessel to at least 2,000 psi.

3. An apparatus as described in claim 2, wherein said extraction vessel is positioned within a subterranean well.

4. An apparatus as described in claim 3, having means adapted to compress and introduce a liquid fluid which is a gas at standard temperature and pressure.

5. An apparatus as described in claim 4, having means adapted to introduce said fluid at a pressure sufficient to give the fluid a specific gravity of at least 0.8 at the top of the well.

6. An apparatus as described in claim 4, having means to introduce a mixture of liquefied gas and material to be extracted.

7. An apparatus as described in claim 3, wherein a vessel for the extraction is suspended in said subterranean well, said vessel comprising an elongated outer shell having a closed lower end and with a concentric pipe positioned therein.

8. An apparatus as described in claim 7, wherein said subterranean well contains a second fluid within said casing, which second fluid at least partially surrounds said vessel.

9. An apparatus as described in claim 8, including means to control temperatures of said second fluid.

10. An apparatus as described in claim 8, wherein said second fluid has a specific gravity in excess of 1.

11. An apparatus as described in claim 3, having recovery means to separate said extracted residue from the mixture of liquid extract and gas at said pressure.

12. An apparatus as described in claim 2, including means to recirculate the charged materials through said well.

* * * * *

UNITED STATES PATENT AND TRADEMARK OFFICE
CERTIFICATE OF CORRECTION

PATENT NO. : 4,929,348
DATED : May 29, 1990
INVENTOR(S) : WAYNE K. RICE

It is certified that error appears in the above—identified patent and that said Letters Patent is hereby corrected as shown below:

On the title page , Item [73] should read as follows:

[73] Assignee: Vitamins, Inc.

Signed and Sealed this

Fourth Day of February, 1992

Attest:

HARRY F. MANBECK, JR.

Attesting Officer

Commissioner of Patents and Trademarks